United States Patent [19]
Meittunen

[11] Patent Number: 5,927,477
[45] Date of Patent: Jul. 27, 1999

[54] CONVEYOR ROLLER WITH AXIAL DIRECT DRIVE

[75] Inventor: Roger J. Meittunen, Hibbing, Minn.

[73] Assignee: Engineering Design Services, Inc., Hibbing, Minn.

[21] Appl. No.: 08/942,772

[22] Filed: Oct. 2, 1997

[51] Int. Cl.⁶ ................................................. B65G 13/06
[52] U.S. Cl. ........................................................ 198/788
[58] Field of Search .......................... 198/788; 432/246, 432/236

[56] References Cited

U.S. PATENT DOCUMENTS

| | | |
|---|---|---|
| 1,725,740 | 8/1929 | Schulte . |
| 1,881,267 | 10/1932 | Drexler .................................... 198/788 |
| 2,175,860 | 10/1939 | Waimann ................................. 198/127 |
| 3,456,605 | 7/1969 | Kremer ..................................... 110/35 |
| 3,568,821 | 3/1971 | Gronvkvist .............................. 198/788 |
| 3,770,103 | 11/1973 | Ball et al. ............................... 198/127 |
| 3,980,170 | 9/1976 | Jakes et al. ............................. 198/782 |
| 4,082,180 | 4/1978 | Chung ..................................... 198/835 |
| 5,007,826 | 4/1991 | Wiining ................................... 432/246 |
| 5,088,596 | 2/1992 | Agnoff .................................... 198/788 |
| 5,413,209 | 5/1995 | Werner .................................... 198/788 |
| 5,462,156 | 10/1995 | Kobayashi et al. ..................... 198/788 |

*Primary Examiner*—William E. Terrell
*Assistant Examiner*—Khoi H. Tran
*Attorney, Agent, or Firm*—Frederick W. Niebuhr

[57] ABSTRACT

A roll conveyor includes a pair of parallel, spaced apart stationary beams and a plurality of elongate cylindrical rollers supported in parallel, side-by-side spaced apart relation for rotation relative to the beams. The rollers are supported and driven individually, each rotated with respect to a pair of non-rotating, coaxial and axially spaced apart first and second shafts. The first shaft is stationary and supports a motorized pulley. A cylindrical housing of the pulley is mounted concentrically and rotatably relative to the stationary shaft. An end plate integral with the housing is shaped to provide an interference fit with a flange secured to one end of the roller, to coaxially align the roller and motorized pulley. The opposite end of the roller includes an idler end region containing an axially inward portion of the second shaft. An axially outward portion of the second shaft is mounted slidably in the axial direction but prevented from rotating. The slidable shaft accommodates thermal expansions and contractions of the roller.

20 Claims, 5 Drawing Sheets

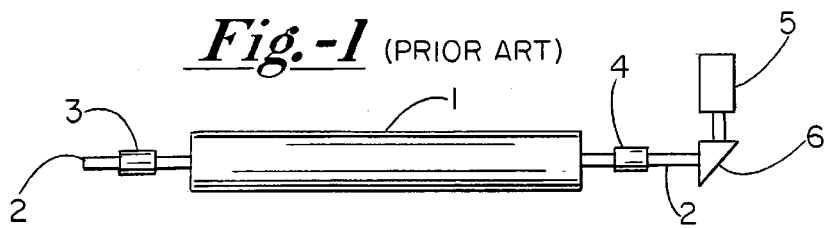
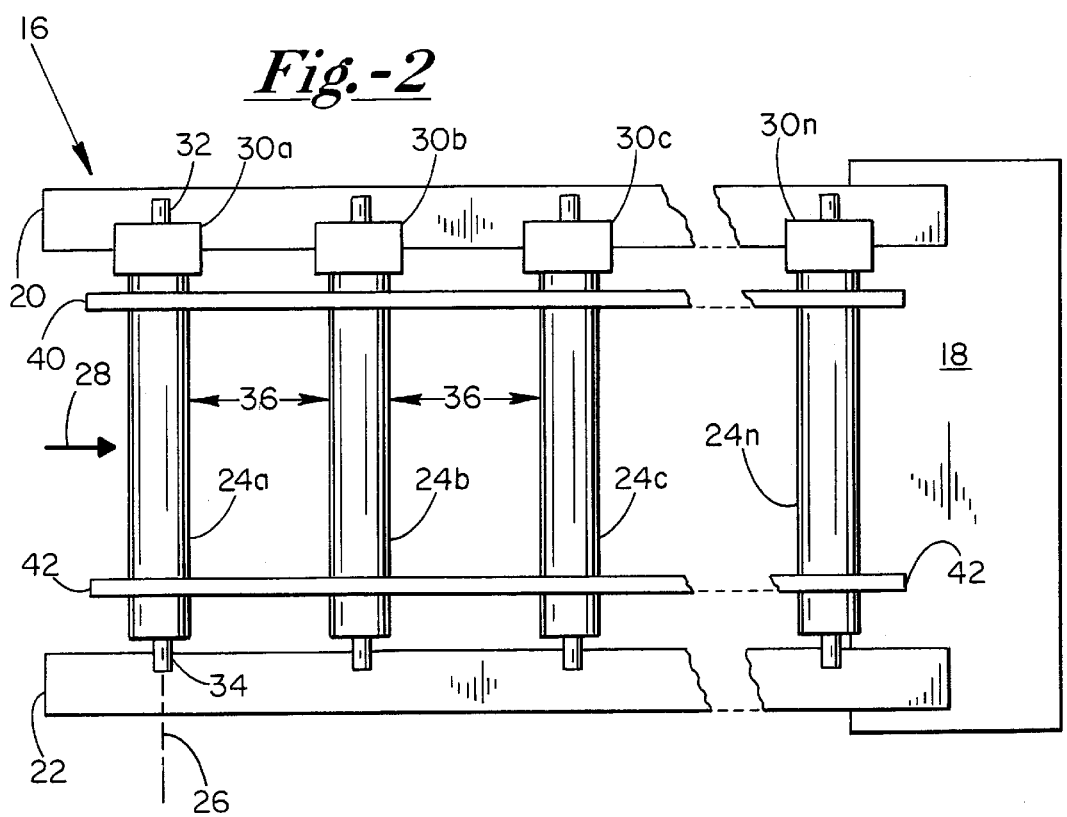
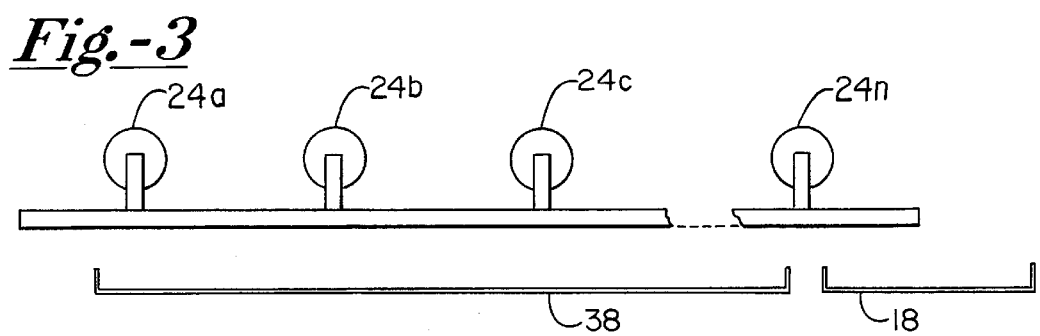

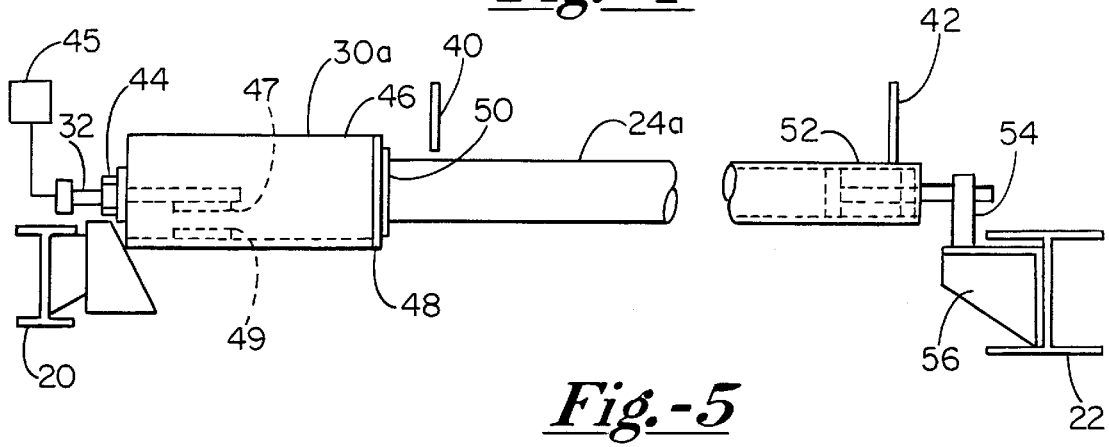
_Fig.-4_
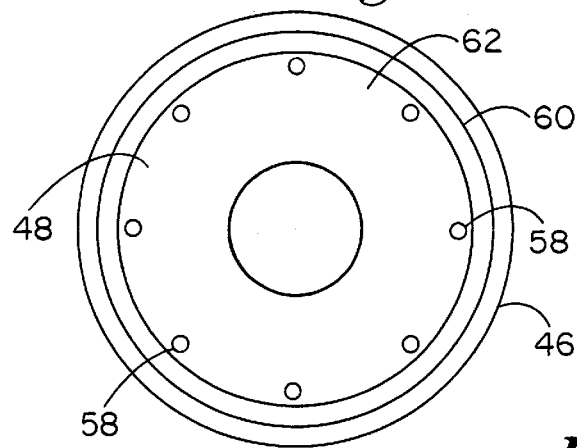
_Fig.-5_
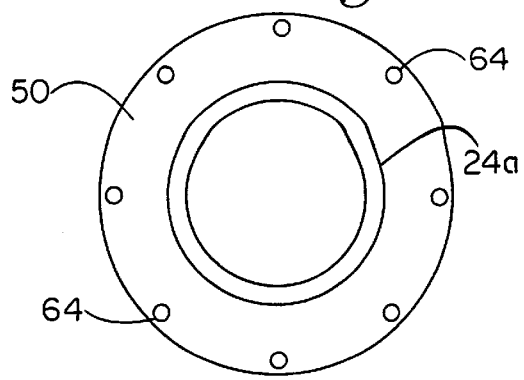
_Fig.-6_

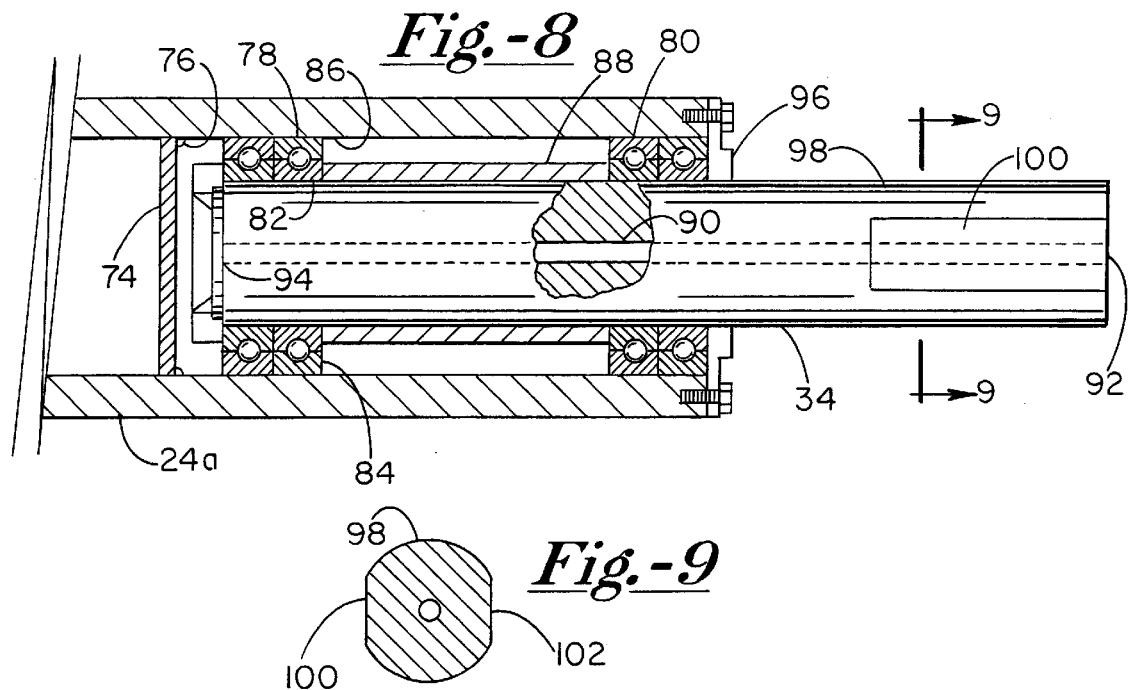
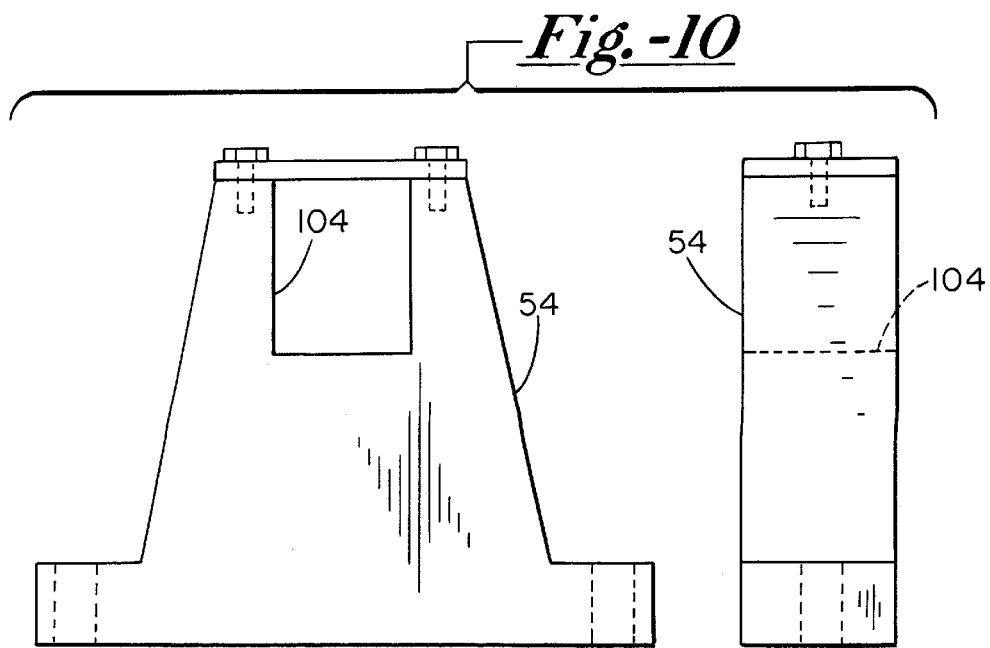

CONVEYOR ROLLER WITH AXIAL DIRECT DRIVE

BACKGROUND OF THE INVENTION

The present invention relates to conveying devices, and more particularly to roller conveyors that employ multiple conveyor rollers side-by-side.

Roller conveyors, also known as roll conveyors, have for many years been used to convey a wide variety of objects and bulk materials. For example, U.S. Pat. No. 1,725,740 (Schulte) features a conveyor for metal rolling mills. Several spaced apart rollers, each journalled in bearings supported on a stationary frame, define a horizontal transport path. Each roll is driven by its own electric motor. Present day roll conveyors are generally similar, although some systems intersperse idler rollers with drive rollers, and other systems have a chain or a belt that links a common drive to all rollers or groups of rollers.

While the present invention is not limited to the handling of any particular material, this disclosure is specifically directed to a roller conveyor for handling taconite (iron ore) pellets. One of the necessary process steps in handling taconite is to harden or fire the taconite pellets. Typically a roller conveyor feeds the green, unfired pellets to a grate where firing takes place. Firing converts the fragile green pellets to hardened pellets more suitable for their transport to steel mills.

Roller conveyors gently convey the green pellets toward the firing grate. The individual rollers are spaced apart from one another in the transport direction to define gaps between adjacent rollers. Fine pellets and dust fall through the gaps and are recirculated back to a balling area for further processing. Consequently, firing and pollution problems due to dust and fine particles are reduced.

Present day roller conveyors for taconite use rollers typically 12–20 feet long, and diameters typically 4–8 inches. Given a particular roller diameter and spacing between adjacent rollers, the number of rollers employed is determined by the desired length of the transport path, and usually is in the range of 15 to 40.

FIG. 1 illustrates a conventional roller and its support and drive arrangement. More particularly, a cylindrical roller 1 is mounted concentrically on a rotating shaft 2 that extends in both axial directions from the roller. The shaft is supported rotatably by two pillow block bearings 3 and 4, and driven by an enclosed fan cooled motor 5 through a right angle reducer 6.

When in use, the roller conveyor is subject to extreme conditions involving excessive dust, high temperatures and considerable fluctuations in temperature. The motor bearings, reducer and other couplings are subject to the dust. Also, when roller 1 and shaft 2 thermally expand responsive to temperature increases, the shaft applies axial thrust loads to the pillow block bearings, causing premature bearing failure. Failure does not prevent the rollers from continuing to operate. However, it does lead to variance in the gap width between adjacent rollers, either increasing or reducing the percentage of fine particles falling between rollers, in either case leading to a lower quality product.

Therefore, it is an object of the present invention to provide a roller conveyor in which the roller support and drive components experience less exposure to dust and fine particulates.

Another object is to provide a roller conveyor in which individual rollers and their respective support components accommodate thermal expansions and contractions.

A further object is to provide, in a conveyor with multiple side-by-side rollers, a support system that more positively maintains the individual rolls concentric on their rotational axes, to more precisely maintain a predetermined spacing between adjacent rollers.

Yet another object is to provide a simpler and more reliable roll conveyor.

SUMMARY OF THE INVENTION

To achieve these and other objects, there is provided a conveyancing apparatus. The apparatus includes a stationary support structure, and a plurality of elongate cylindrical rollers. Each roller is rotatable about a roll axis running lengthwise thereof. A support system mounts the rollers in side-by-side, substantially parallel and in spaced apart relation. With respect to each roller, the support system includes the following components:

a. a first shaft segment maintained in a predetermined orientation relative to the support structure;

b. a drive mechanism for coupling a first end region of the respective roller substantially coaxially with the first shaft segment, for rotation about its respective roll axis relative to the support structure;

c. a second shaft segment, and a shaft carrier for supporting the second shaft segment with respect to the support structure to position the second shaft segment substantially coaxially with the first shaft segment, while allowing the second shaft segment to move axially relative to the support structure; and d. an idler mechanism for coupling a second and opposite end region of the respective roller substantially coaxially with the second shaft segment, for rotation about the respective roll axis.

Preferably the first and second shaft segments are axially spaced apart first and second shafts, with the first shaft being stationary, and the second shaft mounted to prevent its rotation relative to the support structure.

The preferred drive mechanism includes a cylindrical housing surrounding and concentric on the first shaft, a bearing assembly mounting the cylindrical housing for rotation about the first shaft, a motor including a stator integral with the first shaft and a rotor integral with the housing, and a coupling for joining the first end region of the respective roller to the housing so that the roller rotates with the housing. The housing can be enclosed, to protect the motor and bearing assembly against exposure to dust and fine particles.

The coupling can include an annular flange integrally secured to the respective roller at the first end region, and an end plate integral with the housing. The end plate is provided with a depression, sized to accept an axial insertion of the flange to form an interference fit of the end plate and flange, to ensure that the housing and roller are coaxial. Bolts or other fastening means are used to secure the end plate and flange in their aligning coupling.

The idler mechanism includes a bearing assembly surrounding the second shaft and contained within the respective roller along the second end region. Like the cylindrical housing, the roller is enclosed to protect its bearing assembly against exposure to dust and particulates. A passage is provided through the second shaft, for receiving grease or another lubricant and providing the lubricant to the bearing assembly. The lubricant further protects the bearing assembly against exposure to particulates and dust.

The bearing assemblies at the opposite ends of the roller permit rotation of the roller without requiring the first and second shafts to rotate. While the first shaft is stationary, the second shaft is mounted slidably through the carrier. More particularly, an outer end portion of the second shaft with a non-circular profile is received into a slot of the carrier. The shaft can slide within the slot, but cannot rotate. As a result, the carrier accommodates axial thermal expansions and contractions of the roller, without causing any undesirable thrust loads in the drive or support components.

Thus in accordance with the present invention, the multiple rollers of roll conveyors are more accurately positioned, and the spacing between adjacent rollers more precisely maintained over long term use. Bearings are mounted within the roller or the cylindrical housing of the drive mechanism, protected from exposure while allowing the roller to rotate relative to stationary shafts at its opposite ends. The interference fit coupling the roller and the housing maintains the desired coaxial relation among those components, further enhancing reliability over long-term use.

IN THE DRAWINGS

For a further understanding of the above and other features advantages, reference is made to the following detailed description and to the drawings, in which:

FIG. 1 is schematic illustration of a prior art roller support arrangement;

FIG. 2 is a schematic top view of a roll conveyor constructed in accordance with the present invention for feeding unfired taconite pellets to a firing grate;

FIG. 3 is a schematic side view of the roll conveyor;

FIG. 4 is an end view of the conveyor, showing one of the conveyor rollers and its support components;

FIG. 5 is an end view of the drive mechanism;

FIG. 6 is an end view of the roller, separated from its associated drive mechanism;

FIG. 8 is an enlarged view of a portion of FIG. 3, in section;

FIG. 9 is a sectional view taken along the line 9—9 in FIG. 4;

FIG. 10 is an elevation view of a mounting block supporting the roller;

DETAILED DESCRIPTION OF THE PREFERRED EMBODIMENTS

Figure 7:
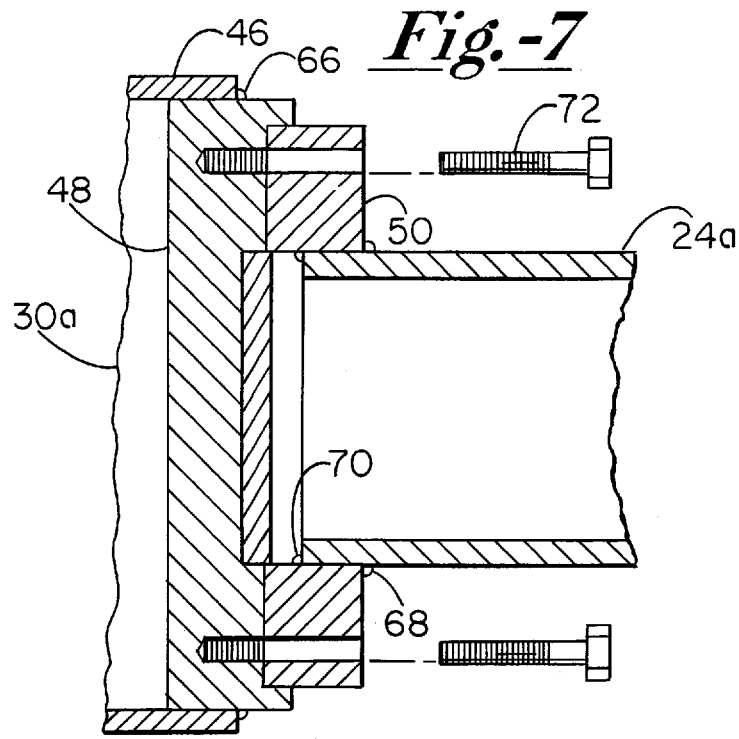
FIG. 7 is an enlarged view of a portion of FIG. 3, drawn in section to illustrate the coupling of the roller and drive mechanism.

Turning now to the drawings, there is shown in FIGS. 2 and 3 a roll conveyor 16 for feeding unfired taconite pellets to a firing grate 18. The conveyor includes a pair of parallel, spaced apart beams 20 and 22 that provide a stationary support structure for the moving parts of the conveyor. A series of rollers 24a, 24b, 24c, . . . 24n are mounted on rails, to rotate relative to the rails about respective roller axes 26 that are vertical as viewed in FIG. 2, i.e. perpendicular to a transport direction indicated at 28. Rollers in taconite handling systems typically have diameters in the range of 4–8 inches, and range in length from about 12 feet to about 20 feet. The number of rollers can vary with the desired length of the conveyance path, and typically is in the range of 15 to 40.

The rollers are supported and rotated independently, each with its own motorized pulley as indicated at 30a–30n. Providing individual drives for the rollers is advantageous, in that failure of one drive does not require shutting down the system. The malfunctioning roller acts as an idler, with its next adjacent rollers moving the taconite pellets or other aggregate. The rollers and pulleys are mounted concentrically on respective pairs of non-rotating shafts. The combination of roller 24a and pulley 30a, for example, is supported by and rotates about a drive end shaft 32 and an idler end shaft 34 coaxial with shaft 32. Shaft 32 is stationary, i.e. integral with beam 20. Shaft 34 is not stationary, but is slidable in the axial direction with respect to beam 22, and further is prevented from rotating as explained below. The other rollers are supported in substantially the same way.

Adjacent rollers are spaced apart from one another to define a series of gaps 36 between them. Gaps 36 are uniform in width as measured in the transport direction. Dust and smaller particles fall through the gaps between the rollers into a collector 38, for conveyance from the collector back to a balling area for further processing. A typical gap width is about ¼th of an inch (6.3 mm). Gap widths can range from about 0.03 inches (0.76 mm) to about 0.5 inches (12.7 mm).

Rollers 24 are aligned with one another such that their respective roller axes are coplanar, and their top surfaces define a planar transport path parallel to the plane containing the axes. As best seen in FIG. 3, the plane is inclined from the horizontal by an angle preferably of about 12 degrees. A pair of parallel, spaced apart skirts 40 and 42 are fixed near the rollers, to confine the taconite pellets to the transport path.

FIG. 4 shows roller 30a and its associated support components in greater detail. A mounting block 32, fixed to beam 20, secures drive and shaft 32. Motorized pulley 30a includes a cylindrical housing or shell 46 that rotates about shaft 32 through internal bearings. Housing 46 is closed and sealed to protect the bearings by minimizing their exposure to dust and fine particulates. Housing 46 includes an opening (not shown) for supplying grease or another suitable lubricant to the bearings inside. Motorized pulley 30a is electrically driven. Electrical current, when provided from a power supply 45 to a stator 47 mounted on shaft 32, causes a rotor 49 and housing 46 to rotate about the shaft.

One particularly preferred motorized pulley is similar to a pulley sold by Interroll Corporation of Wilmington, N.C. under the name "Joki." The standard Joki motorized pulley includes a cylindrical housing rotatable with respect to concentric shafts extending from its opposite ends. According to the invention, this type of pulley is modified at one end, for a direct coupling to one of rollers 24. More particularly, as seen in FIG. 4, no shaft extends from the motorized pulley as a counterpart to shaft 32. Rather, a specially formed end plate 48 is integrally secured to housing 46, e.g. by welding. An annular flange 50 is secured to the end region of roller 24a proximate the pulley, i.e. to the left end as viewed in FIG. 4. End plate 48 and flange 50 are desired to couple with one another in a manner that coaxially aligns roller 24a with shaft 32 and housing 46, as is further explained below.

Idler end shaft 34 is supported rotably within an idler end region 52 of roller 30a. A portion of shaft 34 extending outwardly from the roller is carried by a mounting block 54, which in turn is fixed to beam 22 through a mounting block support 56.

As seen in FIG. 5, end plate 48 includes, near its outer periphery, an arrangement of threaded openings 58 to receive fasteners that secure flange 50 to the end plate. An annular rim 60 runs along the periphery of the end plate, just radially outwardly of openings 58. The rim extends axially outward or to the right as viewed in FIG. 4, and thus defines a depression 62 having a circular profile.

As seen in FIG. 6, a set of peripheral openings 64 are formed through annular flange 50, and are positioned to align with openings 58 of the end plate to facilitate securing the end plate and flange with bolts or other suitable fasteners. The outside diameter of flange 50 is closely matched with the interior diameter of rim 60, so that the flange and the end plate when coupled form an interference fit, in which the flange is inserted axially into depression 62. The flange and depression are precision machined, not only to provide the interference fit but to ensure that the interference fit coaxially aligns housing 46 and roller 24a. Thus, openings 64 and 58 may be formed with a slight tolerance as to their alignment, and are relied upon only to secure the plate/flange coupling, not for the coaxial alignment.

The coupling of end plate 48 with flange 50 is seen in FIG. 7, which also shows an annular weld 66 securing the end plate to housing 46, and two annular welds 68 and 70 securing the mounting flange to the end of roller 24a. A set of bolts 72, two of which are shown, extend through openings 64 and are threaded into openings 58 to secure the end plate/flange coupling.

Figure 7A:
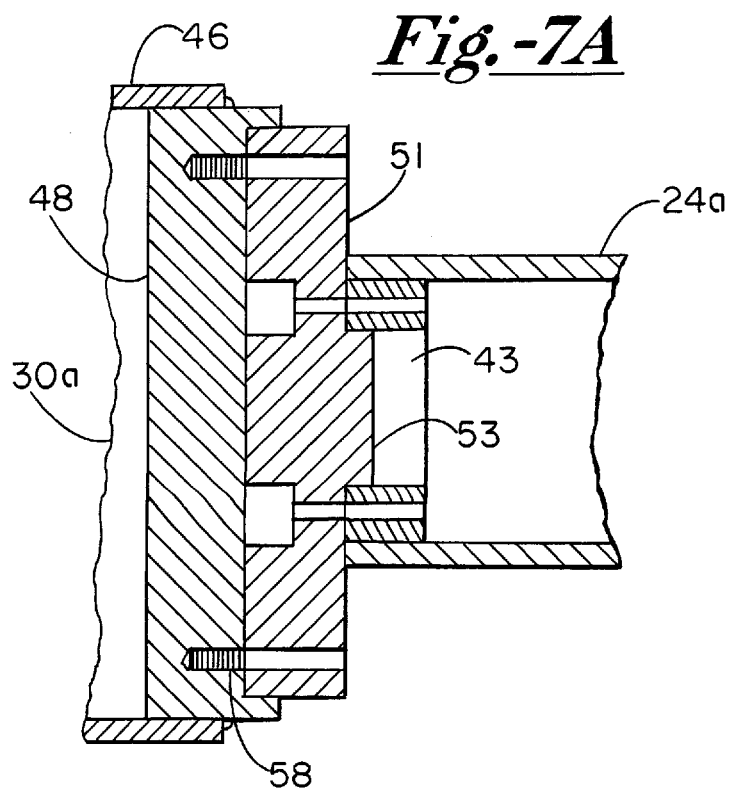
FIG. 7A is a sectional view similar to FIG. 7, showing an alternative embodiment roller/drive mechanism coupling.

An alternative embodiment roller/pulley coupling is shown FIG. 7A. An annular insert 43, preferably formed of steel, is press fit into the end of roller 24a. A series of threaded openings are formed axially through the insert. In lieu of a flange, an end plate 51 is secured to the roller, specifically by bolts received through countersunk openings in end plate 51 and threaded into the openings of insert 43. End plate 51 also has a set of peripheral openings for receiving bolts threaded into openings 58.

The mounting approach shown in FIG. 7A enables disassembly of end plate 51 from roller 24a, which might be an advantage in certain circumstances. Generally, however, the approach shown in FIG. 7 is preferred.

FIG. 8 shows idler end region 52 of roller 24a, along which the roller is mounted to rotate on shaft 34. A cap 74, secured to the roller interior by a weld 76, seals the roller interior along region 52 from the rest of the shaft interior. Within the roller along region 52, a ball bearing assembly including a pair of double ball bearings 78 and 80 mounts roller 24a rotatably and concentrically on shaft 34, with inner races 82 of the bearings integral with the shaft and outer races 84 of the bearings fixed to an interior wall surface 86 of the roller, to rotate with the roller. A shaft sleeve 88 functions as a spacer between bearings 78 and 80, and allows convenient removal of the bearings from shaft 34.

A portion of shaft 34 is removed to show a central axial passage 90 running lengthwise or axially through the shaft. The passage has an entrance 92 to receive grease or another suitable lubricant, and an exit 94 for providing lubricant to the roller interior along end region 52. Preferably, sufficient lubricant is provided to substantially completely occupy the space between the bearings, and between shaft 34 and interior wall surface 86. In addition to its usual lubricating function, the lubricant protects bearings 78 and 80 by resisting the entry of dust and particulates into the roller interior. A seal 96 at the end of the roller provides further protection. It is advantageous to provide lubricant until there is a slight seepage out of the roller, through seal 96. At that point it can reasonably be assumed that the space between shaft 34 and the roller is completely filled with lubricant.

An axially outward end region 98 of shaft 34 is shaped to provide parallel opposite walls 100 and 102, as seen in FIG. 9. Mounting block 54, as best seen in FIG. 10, includes a slot 104 having a width that slightly exceeds the distance between side walls 100 and 102. Accordingly, when region 98 of the shaft is received in to slot 104, the mounting block prevents shaft 34 from rotating.

At the same time, shaft 34 when nested in slot 104 remains free to slide axially relative to the mounting block. Such sliding accommodates thermal expansions and contractions experienced by roller 24a in the axial direction, due to changes in temperature. Thus, the changes in temperature do not lead to any thrust loads or other undesirable forces acting upon the bearings or other components.

While the above description deals only with the mounting and driving of roller 24a, it is to be appreciated that rollers 24b–24n are supported on and rotated with respect to beams 20 and 22 in substantially the same manner, each roller mounted and driven with its respective set of components substantially the same as those just described.

Figure 11:
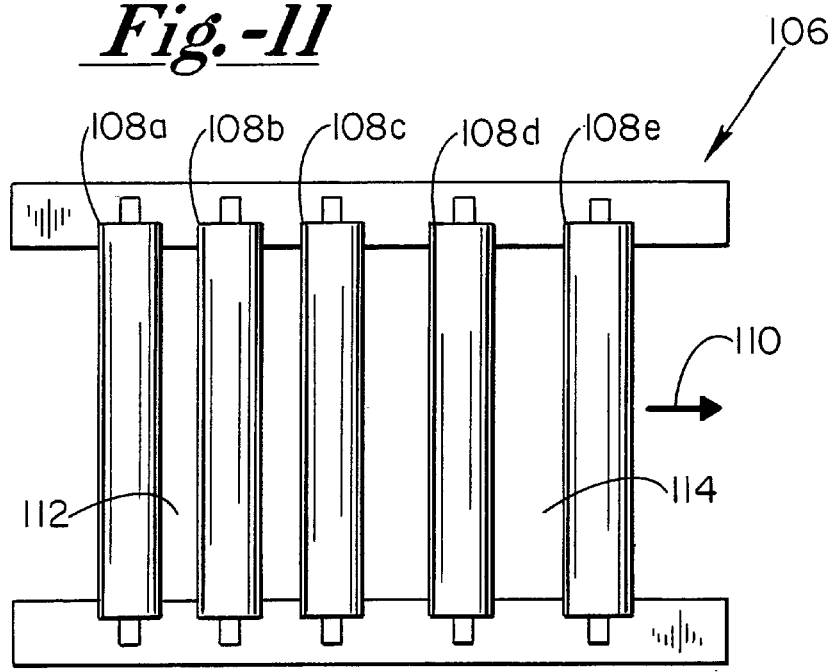
FIGS. 11 and 12 illustrate an alternative embodiment conveyor for sorting an aggregate by size.
Figure 12:
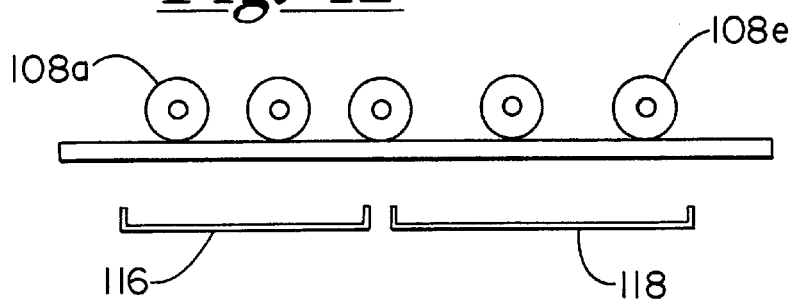

FIGS. 11 and 12 illustrate an alternative roll conveyor 106 in which multiple spaced apart rollers 108 are coplanar, each rotating about a roll axis substantially perpendicular to a transport direction 110. Rollers 108a, 108b and 108c are spaced apart from one another by gaps 112 of the same width. Rollers 108c, 108d and 108e, however, are spaced apart by gaps 114 having a greater width than gaps 112. As taconite pellets or other aggregate materials are moved in the transport direction, dust and fine particulates continue to fall through all of the gaps. Gaps 112 are large enough to pass aggregate up to a predetermined first size. Aggregate larger than the first size, but smaller than a second, larger predetermined size, passes only through gaps 114. Thus, given a first collector 116 beneath gaps 112 and a second collector 118 beneath gaps 114, roll conveyor 106 is capable of sorting the aggregate as to size.

Figure 13:
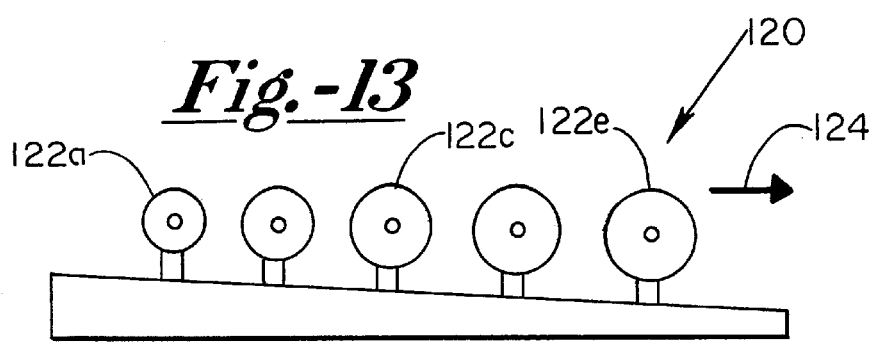
FIG. 13 illustrates another alternative embodiment roller conveyor featuring rollers of different sizes.

FIG. 13 illustrates in side elevation a roll conveyor 120 in which rollers 122a, 122b . . . 122n have increasingly large diameters in a transport direction 124. When all of the conveyor rollers are rotated at the same angular speed, this arrangement provides for an increasing linear or tangential speed as the bulk material or objects progress in the transport direction. An alternative, of course, is to gradually increase the angular speed of identically sized rollers.

Thus in accordance with the present invention, a roll conveyor can continue to perform reliably over the long term in demanding environments. Internal mounting of the bearing assemblies significantly reduces exposure to dust and fine particulates to extend bearing life. The slidable mounting of the shaft at the idler end of the roller effectively accommodates thermal expansion and contractions, which extends bearing life and preserves the integrity of spacing between adjacent rollers. Finally, the interference fit of the motorized pulley shell and the roller provides for ease in assembly, and in reassembly following a repair or inspection, while ensuring more accurate coaxial alignment.

What is claimed is:

1. A conveying apparatus, including:
    a stationary support structure;
    a plurality of elongate cylindrical rollers, each roller rotatable about a roll axis running lengthwise thereof, each of said rollers having a first end region and a second, opposite end region; and a support system for mounting the rollers in side-by-side, substantially parallel and spaced apart relation, said support system including, with respect to each of the rollers:
  a. a stationary first shaft segment integral with the support structure;
  b. a drive mechanism for coupling said first end region of the respective one of said rollers substantially coaxially with the first shaft segment, for rotation about its respective roll axis relative to the first shaft segment;
  c. a second shaft segment, and a shaft carrier for supporting the second shaft segment with respect to the support structure to align the second shaft segment substantially coaxially with the first shaft segment while allowing the second shaft segment to move axially relative to the support structure; and
  d. an idler mechanism for coupling said second and opposite end region of the respective roller substantially coaxially with the second shaft segment, for rotation about the respective roll axis.

2. The apparatus of claim 1 wherein:
the first and second shaft segments are provided as respective first and second shafts axially spaced apart from one another.

3. The apparatus of claim 2 wherein:
the first shaft is stationary, and the second shaft is mounted in a manner to prevent its rotation relative to the support structure.

4. The apparatus of claim 2 wherein:
the idler mechanism includes a bearing assembly surrounding the second shaft and contained within the respective roller along the second end region.

5. The apparatus of claim 4 wherein:
the bearing assembly includes first and second axially spaced apart ball bearings, each having an inner race integral with the second shaft and outer race integral with the roller.

6. The apparatus of claim 4 further including:
a passage through the second shaft including an entrance for receiving a lubricant and an exit near the bearing assembly for supplying the lubricant to the bearing assembly.

7. The apparatus of claim 1 wherein:
the drive mechanism includes a cylindrical housing surrounding and concentric on the first shaft, a bearing assembly mounting the cylindrical housing for rotation about the first shaft, a motor including a stator integral with the first shaft and a rotor integral with the housing, and a coupling for joining the first end region of the respective roller to the housing for rotation with the housing.

8. The apparatus of claim 7 wherein:
the coupling includes an annular flange integrally secured to the respective roller at the first end region, an end plate integral with the housing receiving the flange in an interference fit, and a fastener assembly for releasably securing the flange to the end plate.

9. The apparatus of claim 2 wherein:
the second shaft includes an outer end portion having a non-circular profile, and the shaft carrier includes a slot for nestingly receiving the second shaft along the outer end portion to prevent the shaft from rotating relative to the shaft carrier.

10. The apparatus of claim 1 wherein:
said plurality of rollers are of the same diameter.

11. The apparatus of claim 1 wherein:
adjacent ones of the rollers are spaced apart from one another by a predetermined gap width in a conveyancing direction substantially perpendicular to the roller axes.

12. The apparatus of claim 1 wherein:
the roller axes of the respective rollers are substantially coplanar.

13. A conveyor roller and support apparatus, including:
an elongate cylindrical roller rotatable about a roller axis running lengthwise thereof, said roller having a first end region and a second, opposite end region;
a stationary first support shaft;
a drive mechanism including a housing surrounding the first support shaft and a bearing assembly supporting the housing for rotation relative to the first shaft about a first shaft axis;
a coupling apparatus proximate the first end region for connecting the roller to the housing for rotation with the housing, with the roller axis substantially coaxial with the first shaft axis;
a second shaft spaced apart axially from the first shaft, and a shaft carrier for supporting the second shaft coaxially with the first shaft while allowing the second shaft to move axially with respect to the first shaft; and
an idler mechanism proximate the second end region for coupling the roller substantially coaxially with the second shaft, for rotation about the roller axis relative to the second shaft, and with the roller axis substantially coaxial with a second shaft axis of the second shaft.

14. The apparatus of claim 13 wherein:
the housing is cylindrical and concentric with the first shaft.

15. The apparatus of claim 14 wherein:
the coupling apparatus includes an annular flange integral with the first end region of the roller, an end plate integral with the housing, and a plurality of fasteners for releasably securing the flange to the end plate.

16. The apparatus of claim 15 wherein:
the end plate includes a wall defining a depression for receiving the annular flange axially in an interference fit, whereby axial insertion of the flange into the depression tends to align the roller coaxially with the housing and the first shaft.

17. The apparatus of claim 13 wherein:
the idler mechanism comprises a bearing assembly mounted to the second shaft and to an interior wall portion of the roller along the second end region.

18. The apparatus of claim 17 further including:
a passage through the second shaft including an entrance for receiving a lubricant and an exit near the bearing assembly for supplying the lubricant to the bearing assembly.

19. The apparatus of claim 13 wherein:
the drive mechanism for rotating the housing includes a stator mounted to the first shaft and a rotor integral with the housing, and a current source for supplying an electrical current to the stator.

20. The apparatus of claim 13 wherein:
the second shaft has a non-circular profile along an axially outward end portion thereof, and the shaft carrier includes a slot for nestingly receiving the second shaft along the outward end portion to prevent the second shaft from rotating.

* * * * *